Nov. 25, 1958     C. KUBIN     2,861,384
HOOK EXTRACTOR
Filed Nov. 4, 1957
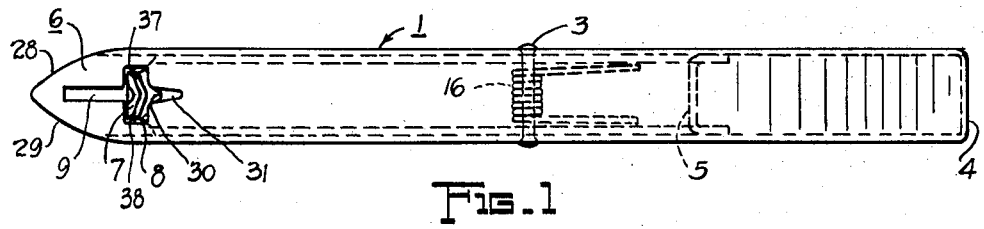
Fig. 1
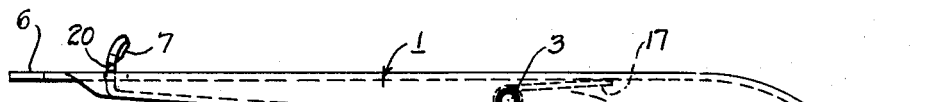
Fig. 2
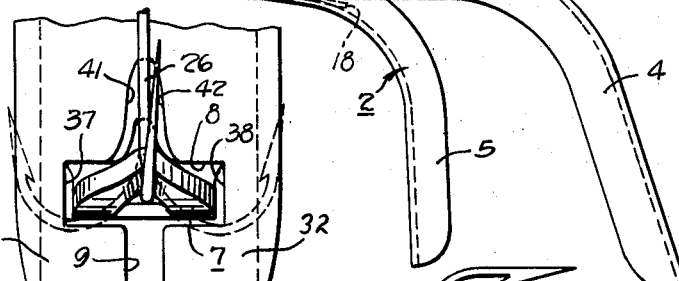
Fig. 5
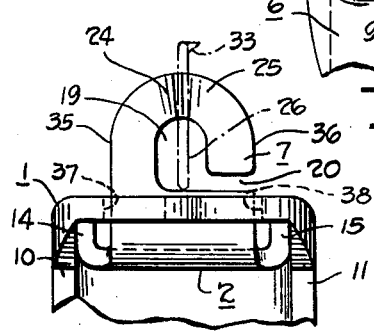
Fig. 4
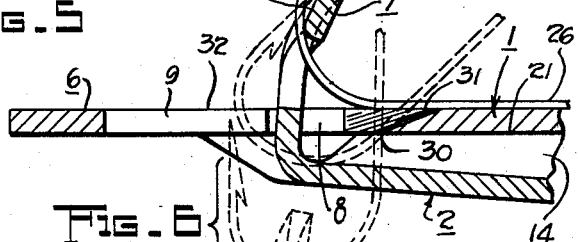
Fig. 6
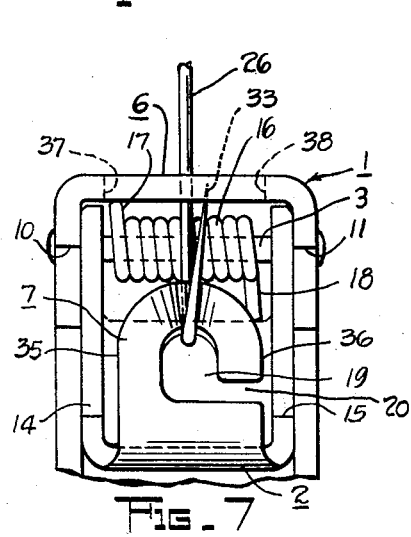
Fig. 7
Fig. 3
INVENTOR.
Charles Kubin
BY Bosworth, Sessions
Herrstrom and Knowles
Attorneys

United States Patent Office 2,861,384
Patented Nov. 25, 1958

2,861,384

HOOK EXTRACTOR

Charles Kubin, Rocky River, Ohio

Application November 4, 1957, Serial No. 694,442

14 Claims. (Cl. 43—53.5)

This invention relates to extraction devices, more particularly to extractors for withdrawing fishhooks from the flesh of fish caught thereon.

One of the most vexing problems of the angler stems from the fact that fishhooks become lodged or embedded at various angles and in different attitudes. In many instances it is extremely difficult to dislodge an embedded hook by ordinary manual manipulation within a reasonably short time without excessive mutilation of the flesh in which the hook is lodged. Furthermore, the unhooking of fish by conventional methods is unpleasant to many persons not only because of the nature and difficulty of the job but because of the risk of being hooked in the process.

Another consideration pertinent to the present invention is that many game fish and fish that are undersize are freed and returned to the water after having been caught. It is obviously desirable that the unhooking of such fish be accomplished with dispatch to minimize the time they are kept out of their natural medium and that there be minimum injury to the flesh of such fish incidental to the unhooking.

In view of the foregoing considerations the principal object of the invention is to provide a fishhook extractor or disgorger which is capable of quickly withdrawing a barbed hook from flesh impaled thereon easily and with minimum injury to the flesh.

Another object is to provide a hook extractor which is capable of first shifting or orienting an embedded hook to predetermined relative position and then applying a reaction force to the impaled flesh immediately adjacent the embedded hook while withdrawing the hook so as to effect hook withdrawal with minimum injury or damage to the flesh. More specifically it is sought to provide such an extractor having cooperating anvil and tool elements mounted for relative movement, the anvil being slotted and the tool being movable through the anvil slot in withdrawing the hook while the anvil applies a reaction force to the flesh in which the hook is embedded. In accordance with the preferred arrangement the anvil slot is cruciated in form and the hook being extracted travels through the other or intersecting portion of the slot. In a specialized version directed to this aspect of the invention the tool is a deformed crook having portions inclined to one another in the shape of a centering V. These inclined crook portions, by engagement with the bight of an embedded fishhook, rotate or orient the fishhook into predetermined position in which the plane of the fishhook extends through the hook-receiving portion of the cruciated slot.

As a further object the invention contemplates the mounting or forming of the anvil and tool elements in cooperative relation on the extremities of a manually operatable forceps for easy manipulation by a fisherman.

Other objects and advantages particularly concerned with the provision of a lightweight inexpensive yet rugged and serviceable fishhook extractor or disgorger are apparent from the following detailed description of a preferred embodiment representing the best known mode of practicing the invention. This description is made in connection with accompanying drawings forming a part of the specification.

In the drawings:

Figure 1 is a top or plan view of the fishhook extractor forceps;

Figure 2 is a side elevational view of the extractor;

Figure 3 is a fragmentary perspective of the end portion of the crook element of the extractor forceps, this view being enlarged with respect to the preceding figures;

Figure 4 is a front view of the working end of the extractor forceps showing the engagement of a fishhook in the bight of the crook element prior to fishhook withdrawing or extracting action, this view being enlarged with respect to Figures 1 and 2 and the handle portions of the forceps being broken away and removed;

Figure 5 is a fragmentary plan view of the working end of the extractor showing the engagement of a fishhook by the crook element of the device, the broken lines showing different positions possible for the fishhook before it is oriented for withdrawal through the anvil slot;

Figure 6 is a sectional detail, partly diagrammatic, taken longitudinally through the anvil slot and illustrating the cooperative action between the crook and the anvil elements of the device in effecting withdrawal of an embedded fishhook; and Figure 7 is a front end view similar to Figure 4 showing the relationship of the parts when the crook and anvil elements are separated after completion of a hook-extracting operation, this view representing the positions of the parts shown by the broken lines of Figure 6.

The present extractor is a unitary device comprising a main or handle member 1 and a companion or trigger member 2 hinged together by a transverse pin 3 to provide forceps action when depending handle portion 4 of the main member 1 and trigger portion 5 of the companion member 2 are grasped and squeezed together by the user. Forward of the pivot pin 3 the main member 1 has a substantially flat end portion 6 comprising the anvil element. This element has a flat working surface the plane of which is parallel to the pivot axis of the forceps. The portion of the companion member 2 forward of the pivot 3 terminates in an angularly disposed upwardly projecting crook 7 which comprises the tool portion of the device. The crook is receivable through transverse branch or part 8 or a cruciated slot formed in the flat portion 6 of the main member 1 and opening through the working surface of the anvil element. A longitudinally extending branch or part 9 of the cruciated slot accommodates the fishhook during the extracting operation, as will appear.

In order to achieve adequate strength and also lightweight construction, the members 1, 2 of the forceps are formed as of channel-shaped sheet metal sections arranged with the open sides of the channels toward one another. The distance between parallel side flanges 10, 11 of the main body member 1 is sufficiently greater than the outside dimension across parallel side flanges 14, 15 of the companion member 2 to permit the latter to nest within and between the flanges 10, 11 of the main member. Thus the flanges 14, 15 of the companion member are embraced, slide against and are guided by the flanges 10, 11 of the main member 1.

The pivot pin 3 is received through aligned openings in the flanges and headed to retain the members together in hinged relation. A helical coil spring 16 received about the pivot pin 3 and having straight end extensions 17, 18 bearing against the members 1, 2, respectively, biases the forces to the closed or initial position shown in Figures 1, 2, 4, 5 and 6 (solid lines).

Forwardly of the pivot or fulcrum pin 3 the flanges 10, 11 of the main member and 14, 15 of the companion member are tapered or progressively reduced in width so that the thickness dimension of the working end portion of the forceps transverse to the plane of the working surface of the anvil element 6 is minimized. This feature facilitates insertion of such working end into the mouth of a fish caught on a hook to be extracted.

The tool element or crook 7 which projects through the transverse branch 8 of the cruciform slot lies generally in a surface curved about the hinge pin axis and inclined rearwardly toward the latter. The base of the tool element is disposed substantially normal or at a right angle to the working surface of the anvil element or forward portion of the trigger member 2. That part of the crook 7 which in the closed attitude of the device projects above the top surface of the anvil element 6 as viewed in Figures 2, 4 and 6 (full lines) has a central through opening 19 to receive the fishhook, as will appear, and a lateral slot 20 continuous with the central opening through which the line or shank of the fishhook is passed in positioning the device for a hook-extracting operation and in releasing an extracted fishhook. In the closed position of the forceps, and as shown to advantage in Figure 4 the lateral slot 20 is at and substantially flush with the top working surface of the anvil element 6, thereby facilitating the placement of the line, fishhook shank or leader into the opening 19 of the crook 7 since the anvil surface guides the line, hook or leader into the mouth of the slot. The width dimension of the crook element 7 is only slightly less than the corresponding dimension of the transverse part or branch 8 of the cruciform slot so that in the closed position of the forceps the crook occupies substantially the full length of the transverse part of the slot. On withdrawal of the crook 7, parallel side edges 35, 36 thereof are closely confined and guided by end walls 37, 38 of the transverse slot 8 to keep the crook centered with respect to the longitudinal part of such slot. It is also to be observed that the forceps members are so proportioned that edges 21 of the flanges 14, 15 of the trigger member 2 are engaged against the inside surface of the web portion of the main handle member 1 to effect predetermined location of the anvil and tool elements 6, 7 relative to one another in such closed position.

The bight or curved part of the crook 7, being the part of the tool element remote from the plane of the working surface of the forward end of the companion member 2, is formed with an undulation or crimp which is symmetrical about a central longitudinal plane normal to such working surface and to the axis of the pivot 3. This crimp provides the crook 7 with a V-shaped notch 23 in its forward face, the notch having smoothly curved sloping sides 24, 25 inclined toward one another to engage a fishhook 26 received in the opening 19 of the crook. When tension is applied to the line or leader of a hook so engaged, the inclined side of the notch which is in contact with the hook has the effect of turning the hooks about its shank as from either of the broken line positions to the full line position of Figure 5, thus orienting such fishhook in proper relation to the tool and anvil elements for the extracting operation.

To use the device in extracting a hook, the fishline or leader of the embedded hook is passed through the lateral slot 20 and into the through opening 19 of the tool element or crook 7. This step is readily accomplished outside the mouth of the fish in which the hook is embedded. Then, using the fishline or leader as a guide and with the forceps in the closed position, the forward end of the device is easily inserted into the mouth of the fish, the tapering edges 28, 29 on the forward end of the anvil 6 coming to a blunt point which facilitates the insertion.

At the initial insertion of the forceps device the engagement of the fishhook against one of the sloping wall portions 24, 25 of the V notch centers the fishhook in the groove 23 and turns the hook upright to the full line position of Figs. 4 and 5, the operator applying tension to the fishline or leader to accomplish this orientation of the hook into the plane of withdrawal which extends through the longitudinal slot portion 9. The operator then squeezes the depending trigger and handle parts 4, 5 of the main and companion members while letting up on the line tension so as to open the forward jaws of the forceps against the biasing force of the spring 16 from the full line position to the broken line position of Figure 6. When the hook is positioned in the withdrawal plane, the opening of the jaws of the forceps rotates the fishhook in such plane and draws it bight foremost through the longitudinal portion 9 of the cruciform slot. This rotary withdrawal motion of the fishhook is illustrated in several stages by the broken lines of Figure 6 and is produced by a force couple acting at spaced points of the hook. One force is applied by the engagement of the bight of the crook 7 in the bight of the fishhook; the other force is applied against the shank of the fishhook by the anvil element 6 at end 30 of inclined bottom 31 formed at one end of the slot part 9. To facilitate the centering of the fishhook in the withdrawal plane, which is normal to the working surface of the anvil 6, and to aid the movement of the hook through the longitudinal slot part 9, the anvil element 6 is formed as by filing to provide the slot bottom 31 which is inclined at an acute angle to the working surface 32 of the anvil. The one end of the longitudinal part of the cruciform slot is thus tapered in depth and has a substantially V-shaped opening through the working surface of the anvil element. The greatest width of such V-shaped opening is at its intersection with the transverse part of the cruciated slot, the slot sides being rounded at such intersection. Tapered sides 41, 42 of the slot adjacent the inclined bottom 31 engage the shank of the fishhook to center the shank in the slot and to prevent lateral shifting of the fishhook during the withdrawal operation. The inclined groove bottom 31 serves as a guide for the fishhook as the latter is drawn through the slot in an extracting operation, this one end of the longitudinal part of the slot thus having an opening through the working surface 32 on the one side of the anvil element which is of greater length than the opening of the same slot end through the other side of the anvil element.

In the rotary extracting movement of the fishhook represented in successive stages by the broken lines of Figure 6 the flesh of the fish impaled on the fishhook barb 33 is engaged by and against the smooth upper surface of the anvil portion 6 to prevent the flesh following the hook. Thus the fishhook is extracted from the flesh with minimum injury; the hook is undamaged and can be used over and over.

A suitable stop is provided to limit the opening movement of the forceps to the position shown by the broken lines of Figure 6 and the full lines of Figure 7, so as to prevent undesirable distension of the mouth of the fish by the forward ends of the members 1, 2 of the forceps. Such separating or opening movement of the forceps is conveniently limited by forming the upper edge of the flanges 14, 15 of the companion member 2, rearwardly or to the right of pivot 3 as viewed in Figures 1 and 2, so as to engage the inside of the web portion of the main member 1 at a point spaced rearwardly from the pivot 3. With the opening movement of the forceps thus limited the operator is able easily to hold the forceps in the distended position indicated by the broken lines of Figure 6 and the full line of Figure 7 for the withdrawal of the extracted fishhook from the mouth of the fish with the point 34 of the fishhook shrouded by the anvil element 6 so as to prevent again impaling the fish on the hook as the latter is withdrawn from the fish's mouth.

Thus the present invention is seen to provide a simple and easily operated device for quickly extracting a fishhook from flesh impaled thereon with injury to such flesh. The hook extraction is accomplished by a force couple applied to the hook so as to rotate it substantially in the plane of the hook. This minimizes tearing of the flesh. The application by the anvil 6 of reaction force to the impaled flesh immediately adjacent the hook avoids unnecessary tearing and cutting of the impaled flesh. In the event the fishhook is to one side or the other of the desired withdrawal plane the application of tension to the leader or line automatically rotates the fishhook about its shank axis by reason of the engagement of the hook against one or the other of the sloping surfaces 24, 25 in the bight of the crook of the tool element 7. Furthermore this orientation of the fishhook into the withdrawal plane is accomplished automatically inside the mouth of the fish without any need for special skill or training or even any requirement that it be observed by the operator.

Although illustrated in a single embodiment the invention is capable of use in numerous modifications, variations in proportions of the parts being contemplated as well as omission of some of the features when desired. It is intended that the patent cover, by delineation in the appended claims, all features of patentable novelty residing in the invention.

What I claim as my invention and desire to secure by and in accordance with the patent laws of the United States is:

1. A fishhook extractor comprising an anvil element having a working surface on one side, the element being formed with a cruciated through slot comprising longitudinal and transverse intersecting parts which open through said working surface, a tool element comprising a crook having a central opening and a slot in one side continuous with the central opening to allow a line attached to a fishhook to be passed laterally through the crook slot into the crook opening, and means mounting the elements for predetermined relative movement between hook receiving relative positions in which the tool element is disposed in and the crook projects through the transverse part of the cruciated slot, and relative positions in which the crook of the tool element is withdrawn from the cruciated slot of the anvil element, the tool and anvil elements being adapted, when moved from said hook receiving relative positions to said withdrawn relative positions with a fishhook engaged through the crook and held yieldingly against the latter to draw the fishhook, bight foremost, through the longitudinal part of the cruciated slot, whereby to extract the fishhook from flesh impaled thereon by reaction of such flesh against the working surface of the anvil element during such movement of the elements to the withdrawn relative positions.

2. An extractor as in the preceding claim in which the working surface of the anvil element is flat.

3. An extractor as in claim 1 in which the side slot of the crook is located at the working surface of the anvil when the elements are disposed in hook receiving relative positions whereby the working surface serves as a guide for a fishhook being passed into the crook through such side slot.

4. An extractor as in claim 1 in which the crook has substantially parallel side edges closely confined and guided by the anvil element at the ends of the transverse part of the cruciform slot to keep the crook centered with respect to the longitudinal part of such slot during withdrawal movement.

5. An extractor as in claim 1 in which the crook is formed with a bight comprising angularly disposed portions forming a V centered over the longitudinal portion of the cruciated slot and engageable with a fishhook received through the crook and drawn against the bight to shift such a fishhook to predetermined position relative to the cruciated slot.

6. An extractor as in claim 1 in which the anvil element is formed to provide a bottom in one end of the longitudinal part of the cruciated slot, said slot bottom being inclined at an acute angle to the working surface so that at said one end the longitudinal part of the cruciated slot has an opening of greater length through the one side of the anvil element than the length of the slot opening through the other side.

7. An extractor as in claim 6 in which the opening of said one end of the cruciated slot through the working surface is substantially V-shaped and the greatest width of such V-shaped opening is located at its intersection with the transverse part of the cruciated slot.

8. An extractor as in claim 1 in which the anvil and tool elements are fast on the ends of elongated members hinged together to pivot about an axis spaced from such elements and constituting a forceps.

9. An extractor as in claim 8 in which each of the forceps members has a pair of spaced parallel integral flanges, the flanges of one member being engageable against the other member to limit the opening movement of the forceps and thereby establish the limit of withdrawal movement of the tool element relative to the anvil element.

10. An extractor as in claim 8 in which the working surface of the anvil is in a plane parallel to the pivot axis of the forceps.

11. An extractor as in claim 8 in which the anvil element is formed with a pointed end projecting along an axis substantially normal to and directed away from the pivot axis to facilitate insertion of the extractor into the mouth of a fish.

12. An extractor as in claim 8 in which the crook is substantially normal to the elongated member on which it is fast and projects therefrom as a cantilever, the bight of the crook being remote from such elongated member and inclined toward the pivot axis.

13. An extractor as in claim 8 in which the crook lies substantially in a surface concentric to the pivot axis and the transverse part of the cruciated slot parallels such axis.

14. An extractor as in claim 8 including stressed spring means reacting against the elongated members of the forceps and biasing the tool and anvil elements toward hook receiving relative positions.

No references cited.